US012601641B2

(12) United States Patent
Tanaka et al.

(10) Patent No.: US 12,601,641 B2
(45) Date of Patent: Apr. 14, 2026

(54) TEMPERATURE ESTIMATION METHOD, TEMPERATURE ESTIMATION PROGRAM AND TEMPERATURE ESTIMATION DEVICE

(71) Applicant: NTT, Inc., Tokyo (JP)

(72) Inventors: Yujiro Tanaka, Tokyo (JP); Daichi Matsunaga, Tokyo (JP)

(73) Assignee: NTT, INC., Tokyo (JP)

( * ) Notice: Subject to any disclaimer, the term of this patent is extended or adjusted under 35 U.S.C. 154(b) by 427 days.

(21) Appl. No.: 18/254,688

(22) PCT Filed: Nov. 30, 2020

(86) PCT No.: PCT/JP2020/044460
§ 371 (c)(1),
(2) Date: May 26, 2023

(87) PCT Pub. No.: WO2022/113331
PCT Pub. Date: Jun. 2, 2022

(65) Prior Publication Data
US 2024/0302224 A1 Sep. 12, 2024

(51) Int. Cl.
*A61B 5/01* (2006.01)
*G01K 7/00* (2006.01)
*G01K 13/20* (2021.01)

(52) U.S. Cl.
CPC .............. *G01K 13/20* (2021.01); *G01K 7/00* (2013.01)

(58) Field of Classification Search
CPC ............. A61B 5/01; G01K 13/20; G01K 7/00
See application file for complete search history.

(56) References Cited

U.S. PATENT DOCUMENTS

| | | | | |
|---|---|---|---|---|
| 6,821,016 B2 * | 11/2004 | Sato | .......................... | G01J 5/064 600/549 |
| 2006/0084854 A1 * | 4/2006 | Cho | .................... | A61B 5/14532 600/326 |
| 2016/0069752 A1 * | 3/2016 | Shimizu | .................. | G01K 13/20 600/549 |
| 2016/0123859 A1 * | 5/2016 | Oh | .......................... | H05B 1/023 219/448.12 |
| 2017/0209053 A1 * | 7/2017 | Pantelopoulos | ..... | A61B 5/7278 |
| 2019/0155347 A1 * | 5/2019 | Ishii | .......................... | G06F 1/206 |
| 2020/0037884 A1 * | 2/2020 | Ishida | ...................... | A61B 5/01 |
| 2021/0186337 A1 | 6/2021 | Matsunaga et al. | | |

FOREIGN PATENT DOCUMENTS

JP          2020003291 A          1/2020

* cited by examiner

*Primary Examiner* — Daniel L Cerioni
(74) *Attorney, Agent, or Firm* — Slater Matsil, LLP

(57) ABSTRACT

A temperature estimation method includes bringing a first thermal resistance member into contact with the test subject, measuring a first temperature of a surface of the test subject, calculating a temperature normalized by an instantaneous value of the first temperature of the surface of the test subject and the temperature of the first thermal resistance member and a setting value of the temperature of the surface of the test subject, deriving, as a temperature wave arrival time, deriving a proportionality coefficient based on the temperature wave arrival time, measuring a second temperature of the surface of the test subject, measuring a third temperature of a surface of the second thermal resistance member on a side opposite to the surface on the test subject side, and calculating an internal temperature of the test subject based on the second temperature, the third temperature, and the proportionality coefficient.

13 Claims, 8 Drawing Sheets

Fig. 5

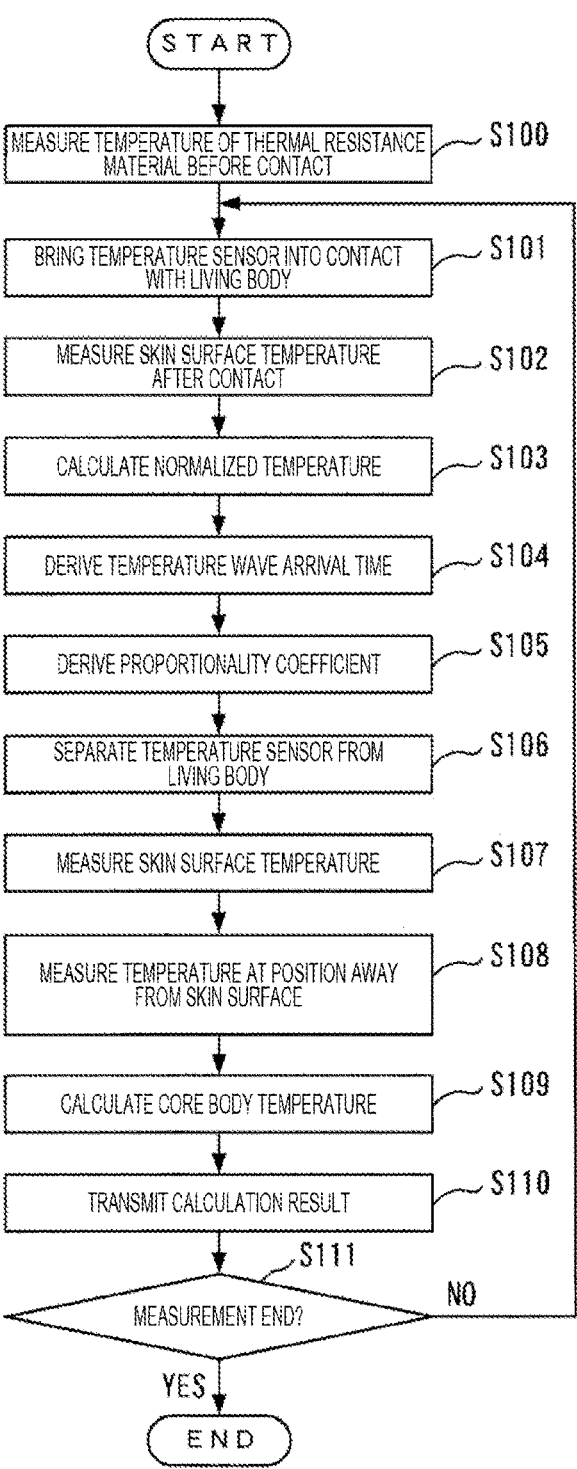

START

MEASURE TEMPERATURE OF THERMAL RESISTANCE MATERIAL BEFORE CONTACT — S100

BRING TEMPERATURE SENSOR INTO CONTACT WITH LIVING BODY — S101

MEASURE SKIN SURFACE TEMPERATURE AFTER CONTACT — S102

CALCULATE NORMALIZED TEMPERATURE — S103

DERIVE TEMPERATURE WAVE ARRIVAL TIME — S104

DERIVE PROPORTIONALITY COEFFICIENT — S105

SEPARATE TEMPERATURE SENSOR FROM LIVING BODY — S106

MEASURE SKIN SURFACE TEMPERATURE — S107

MEASURE TEMPERATURE AT POSITION AWAY FROM SKIN SURFACE — S108

CALCULATE CORE BODY TEMPERATURE — S109

TRANSMIT CALCULATION RESULT — S110

S111

MEASUREMENT END?          NO

YES

END

TEMPERATURE ESTIMATION METHOD, TEMPERATURE ESTIMATION PROGRAM AND TEMPERATURE ESTIMATION DEVICE

CROSS-REFERENCE TO RELATED APPLICATIONS

This application is a national phase entry of PCT Application No. PCT/JP2020/044460, filed on Nov. 30, 2020, which application is hereby incorporated herein by reference.

TECHNICAL FIELD

The present invention relates to a temperature estimation method, a temperature estimation program, and a temperature estimation apparatus for estimating an internal temperature of a test subject such as a living body.

BACKGROUND

As a method for estimating a core body temperature of a living body, an in-vivo temperature estimation method disclosed in Patent Literature 1 is known. The method disclosed in Patent Literature 1 estimates a core body temperature TCBT of a living body 100 using a thermal equivalent circuit model of the living body 100 and a sensor 101 as illustrated in FIG. 8. The sensor 101 measures a skin surface temperature Tskin and a skin surface heat flux HS of the living body 100. Ttop denotes a temperature of an upper surface of the sensor 101 on a side opposite to the surface that comes into contact with the skin of the living body 100, TAir denotes an external temperature, RB denotes a thermal resistance of the living body 100, RS denotes a thermal resistance of the sensor 101, and RA denotes a thermal resistance of external air. An equation for estimating the core body temperature TCBT is as follows.

$$T_{CBT} = T_{skin} + AH_S \tag{1}$$

The proportionality coefficient A in Equation (1) is determined by thermal resistance RB of the living body 100. The proportionality coefficient A can be generally obtained by assuming a rectal temperature or an eardrum temperature measured by another sensor at the time of initial calibration as the core body temperature TCBT and using the core body temperature TCBT and the temperature Tskin and the heat flux HS measured by the sensor 101.

The thermal resistance RB of the living body 100 is expressed by the following equation by thermal conductivity k of the living body 100, a thickness d from the skin surface to the core part, and an area S (the size of the sensor 101) through which heat is transferred.

$$R_B = d/k/S \tag{2}$$

In the conventional method, the thermal resistance RB of the living body 100 is constant, and the proportionality coefficient A is also constant. However, the thermal resistance RB differs among individuals and varies depending on a mounting place of the sensor 101, and further varies depending on the increase or decrease of the blood flow of the living body 100 during the measurement of the core body temperature TCBT. Therefore, there is a problem that an error occurs in the estimation of the core body temperature TCBT because the proportionality coefficient A changes due to individual differences, the mounting place of the sensor 101, a change in blood flow, and the like.

CITATION LIST

Patent Literature

Patent Literature 1: JP 2020-3291 A

SUMMARY

Technical Problem

The present invention was made in order to solve the above problem, and an object thereof is to provide a temperature estimation method, a temperature estimation program, and a temperature estimation apparatus capable of reducing an estimation error of an internal temperature of a test subject such as a living body.

Solution to Problem

A temperature estimation method of the present invention includes: a first step of measuring a temperature of a first thermal resistance member provided with a first temperature sensor by the first temperature sensor before the first thermal resistance member comes into contact with a test subject; a second step of bringing the first thermal resistance member and the first temperature sensor into contact with the test subject; a third step of measuring a temperature of a surface of the test subject by the first temperature sensor; a fourth step of calculating a temperature obtained by normalizing an instantaneous value of the temperature of the surface of the test subject by the temperature of the first thermal resistance member and a setting value of the temperature of the surface of the test subject for each time after a time at which the first thermal resistance member and the first temperature sensor come into contact with the test subject; a fifth step of deriving, as a temperature wave arrival time, a time from a time point at which the first thermal resistance member and the first temperature sensor come into contact with the test subject to when the normalized temperature reaches a threshold value; a sixth step of deriving a proportionality coefficient depending on a thermophysical property value of the test subject on the basis of the temperature wave arrival time; a seventh step of separating the first thermal resistance member and the first temperature sensor from the test subject; an eighth step of measuring the temperature of the surface of the test subject by a second temperature sensor provided on a surface of a second thermal resistance member on a test subject side; a ninth step of measuring a temperature at a position away from the test subject by a third temperature sensor provided on a surface of the second thermal resistance member on a side opposite to the surface on the test subject side; and a tenth step of calculating an internal temperature of the test subject on the basis of measurement results of the eighth and ninth steps and the proportionality coefficient.

In addition, a temperature estimation program of the present invention causes a computer to execute the fourth step, the fifth step, the sixth step, and the tenth step.

In addition, a temperature estimation apparatus of the present invention includes: a first thermal resistance member; a first temperature sensor provided on a surface of the first thermal resistance member facing a test subject; a connection/separation mechanism capable of bringing the first thermal resistance member and the first temperature sensor into contact with and separating from the test subject; a normalized temperature calculation unit configured to calculate, for each time, a temperature obtained by normalizing an instantaneous value of a temperature of a surface of the test subject measured by the first temperature sensor after the first thermal resistance member and the first temperature sensor come into contact with the test subject by a temperature of the first thermal resistance member measured by the first temperature sensor before the contact and a setting value of the temperature of the surface of the test subject after the contact; a temperature wave arrival time derivation unit configured to derive, as a temperature wave arrival time, a time from a time point at which the first thermal resistance member and the first temperature sensor come into contact with the test subject to when the normalized temperature reaches a threshold value; a proportionality coefficient derivation unit configured to derive a proportionality coefficient depending on a thermophysical property value of the test subject on the basis of the temperature wave arrival time; a second thermal resistance member that contacts the test subject; a second temperature sensor configured to be provided on a surface of the second thermal resistance member on a test subject side and measure the temperature of the surface of the test subject; a third temperature sensor configured to be provided on a surface of the second thermal resistance member on a side opposite to the surface on the test subject side and measure a temperature at a position away from the test subject; and a temperature calculation unit configured to calculate an internal temperature of the test subject on the basis of measurement results of the second and third temperature sensors after the first thermal resistance member and the first temperature sensor are separated from the test subject and the proportionality coefficient.

Advantageous Effects of Invention

According to the present invention, after the time at which the first thermal resistance member and the first temperature sensor come into contact with the test subject, the temperature obtained by normalizing the instantaneous value of the temperature of the surface of the test subject by the temperature of the first thermal resistance member before the contact and the setting value of the temperature of the surface of the test subject after the contact is calculated for each time, the time from the time point at which the first thermal resistance member and the first temperature sensor come into contact with the test subject to when the normalized temperature reaches the threshold value is derived as the temperature wave arrival time, and the proportionality coefficient depending on the thermophysical property value of the test subject is derived on the basis of the temperature wave arrival time, so that it is possible to correct the proportionality coefficient that changes depending on the individual difference of the test subject and the blood flow, and thus it is possible to reduce an estimation error of the internal temperature of the test subject.

BRIEF DESCRIPTION OF THE DRAWINGS

FIG. 5 is a flowchart describing operations of the temperature estimation apparatus according to the example of the present invention.

DETAILED DESCRIPTION OF ILLUSTRATIVE EMBODIMENTS

[Principle of Invention]

A heat transfer method is generally described by a heat conduction expression of Equation (3).

[Math. 1]

$$\frac{\partial T}{\partial t} = \alpha \frac{\partial^2 T}{\partial^2 z} \qquad (3)$$

Figure 1:
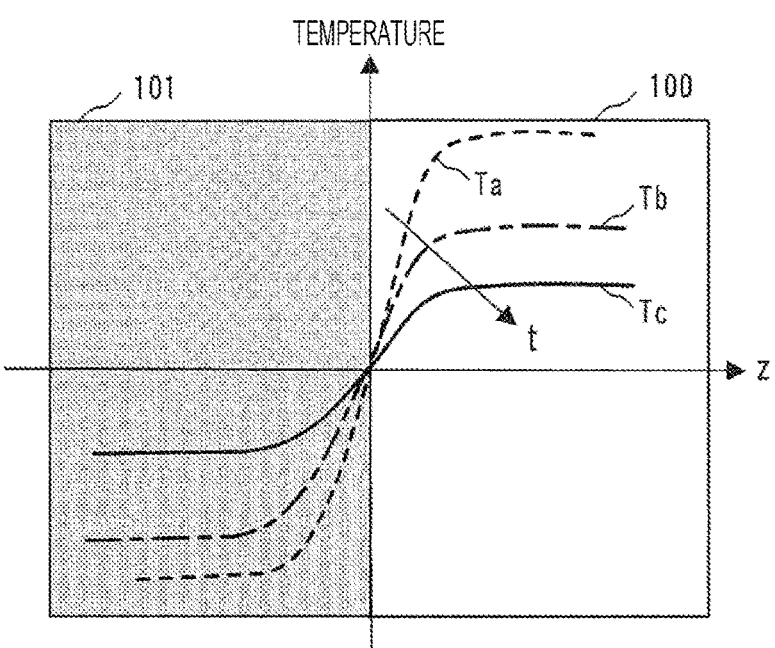
FIG. 1 is a diagram illustrating an example of temporal changes in temperatures of a sensor and a living body.
Figure 8:
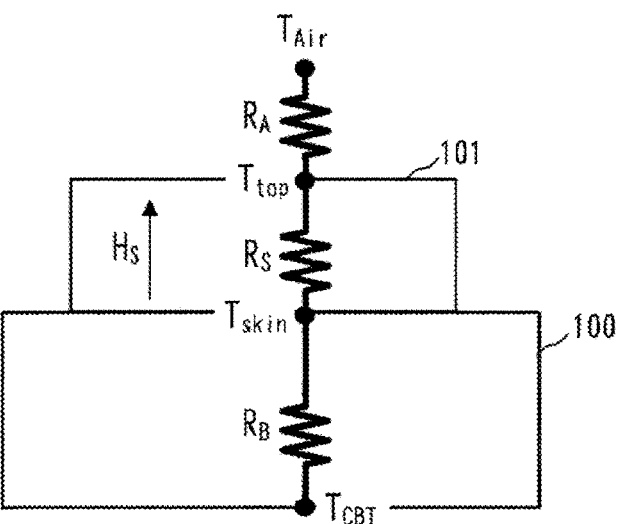
FIG. 8 is a diagram illustrating a thermal equivalent circuit model of a living body and a sensor.

In Equation (3), $\alpha$ denotes heat diffusivity that is a value unique to an object, T denotes a temperature, z denotes coordinates in the depth direction, and t denotes a time. As illustrated in FIG. 8, a one-dimensional heat transfer method will be considered. As illustrated in FIG. 1, when the sensor 101 and the living body 100 come into contact with each other, heat exchange occurs between the sensor 101 and the living body 100 via a contact interface, and the temperature of the sensor 101 changes. In the example in FIG. 1, the temperature changes from the temperature represented by Ta to the temperature represented by Tb and further changes to the temperature represented by Tc with elapse of the time t.

From Equation (3), a temperature distribution T(z,t) in the living body 100 can be obtained as Equation (4) by using a temperature Tsens_stb of the sensor 101 before contact with the living body 100 and a setting value Tskin_i of the surface temperature of the living body 100 after contact with the sensor 101.

[Math. 2]

$$\frac{T(z, t) - T_{sens\_stb}}{(T_{skin\_i} - T_{sens\_stb})} = \text{erf}\left(\frac{z}{2\sqrt{\alpha t}}\right) \qquad (4)$$

The heat diffusivity $\alpha$ of the living body 100 is expressed by the following equation.

$$\alpha = k/\rho/C \qquad (5)$$

As described above, k is the thermal conductivity of the living body 100, ρ is the density of the living body 100, and C is the heat capacity of the living body 100.

Here, the relationship between the thermal resistance RB of the living body 100 shown in Equation (2) and the heat diffusivity a shown in Equation (5) will be considered. From Equation (4), the time taken for the temperature wave to be transferred from the portion of the depth z of the living body 100 to the sensor 101 is $2\sqrt{}/(\alpha t)$. That is, the distance (depth z) over which the temperature wave transfers is proportional to the square root of the time t.

$$z \propto 2\sqrt{(\alpha t)} \tag{6}$$

Since Equation (7) is obtained from Equation (2), Equation (8) is obtained from Equations (6) and (7).

$$z = d = R_B k/S \tag{7}$$

$$R_B k/S \propto 2\sqrt{(\alpha t)} \tag{8}$$

From Equation (8), it can be seen that the thermal resistance RB of the living body 100 is proportional to the square root of the temperature wave arrival time t.

$$R_B \propto \sqrt{t} \tag{9}$$

That is, the proportionality coefficient A necessary for estimating the core body temperature of the living body 100 is also proportional to the square root of the temperature wave arrival time t.

Figure 2:
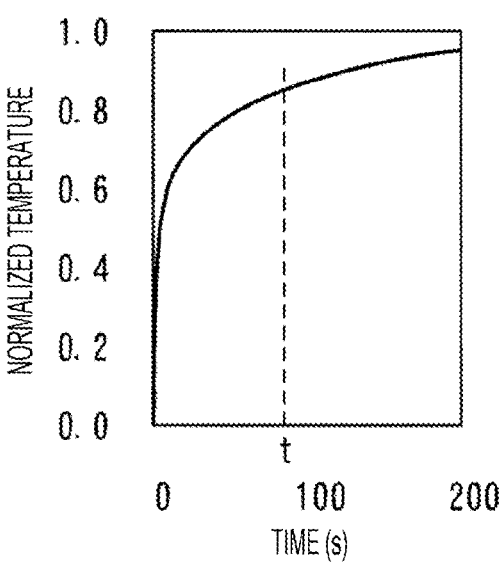
FIG. 2 is a diagram illustrating one example of temporal changes in a normalized temperature.

The temperature wave arrival time t until the temperature of the sensor 101 rises by the heat transferred from the inside of the living body 100 is defined as a time until the temperature normalized as in the left side of Equation (4) reaches a predetermined threshold value. In the calculation of the normalized temperature, an instantaneous value of the temperature measured by the sensor 101 is T(z,t), and a setting value of the temperature measured by the sensor 101 is Tskin_i. In the example of FIG. 2, the threshold value of the normalized temperature is 0.85.

Figure 3:
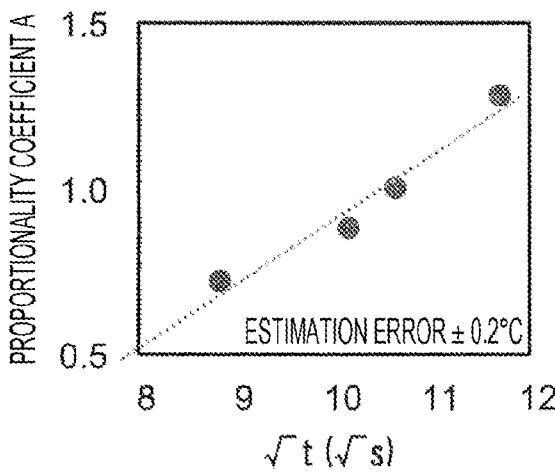
FIG. 3 is a diagram illustrating one example of a relationship of a proportionality coefficient and a temperature wave arrival time.

When the thermal transmittance of the sensor 101 is equivalent to the thermal transmittance $\sqrt{(\rho C k)}$ of the living body 100, the temperature wave is smoothly transferred to the sensor 101, and the relationship between the proportionality coefficient A and the temperature wave arrival time t as illustrated in FIG. 3 is obtained.

Example

Figure 4:
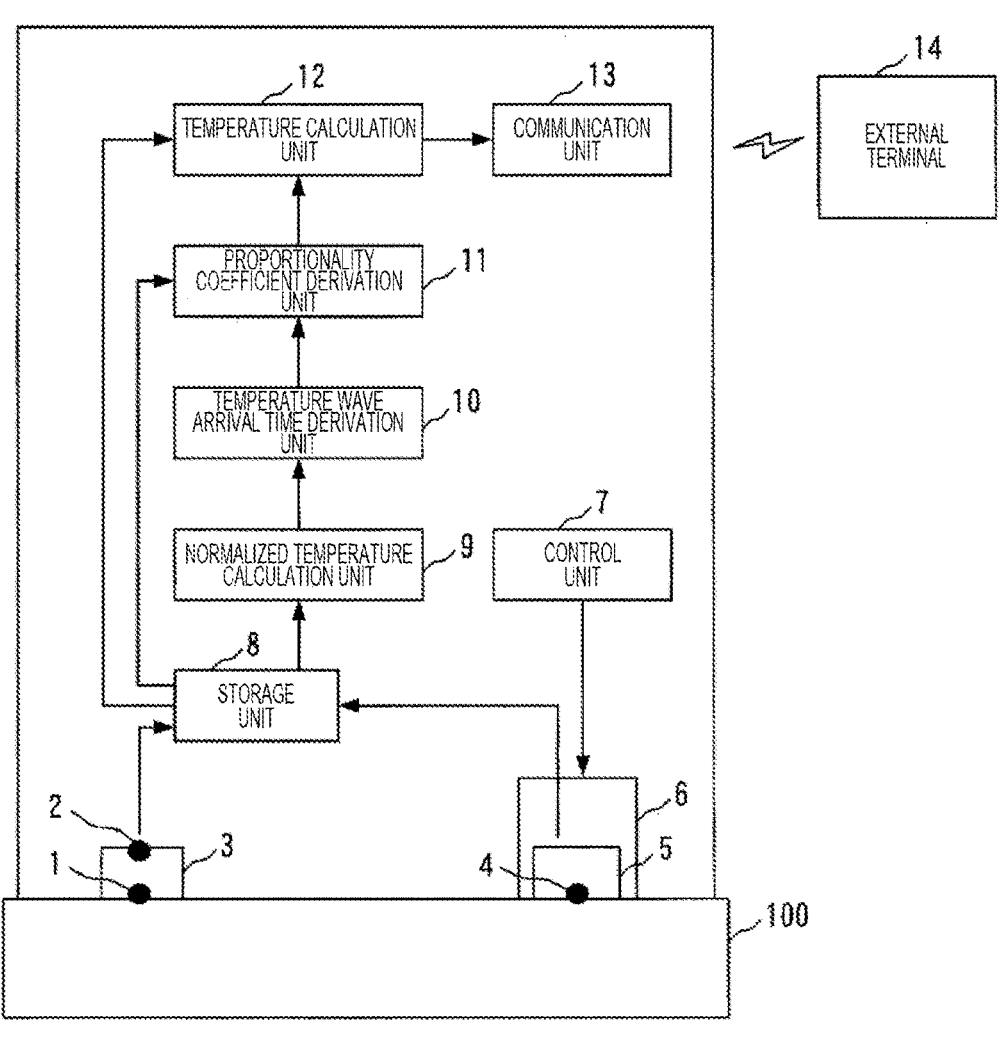
FIG. 4 is a block diagram illustrating a configuration of a temperature estimation apparatus according to an example of the present invention.

Hereinafter, an example of the present invention will be described with reference to the drawings. FIG. 4 is a block diagram illustrating a configuration of the temperature estimation apparatus according to an example of the present invention. The temperature estimation apparatus includes a temperature sensor 1 that measures the temperature TSkin of the skin surface of the living body 100 (test subject), a temperature sensor 2 that measures the temperature Ttop at a position away from the living body 100, a thermal resistance member 3 that holds the temperature sensors 1 and 2, a temperature sensor 4 that measures the temperature Tsens_stb before contact with the living body 100 and the temperature T of the skin surface of the living body 100 after contact, a thermal resistance member 5 that holds the temperature sensor 4, a connection/separation mechanism 6 that can thermally connect and separate the thermal resistance member 5 and the temperature sensor 4 to and from the skin surface of the living body 100, a control unit 7 that controls the connection/separation mechanism 6, a storage unit 8 that stores in advance a calibration table in which the proportionality coefficient A corresponding to a square root of the temperature wave arrival time t is registered, a normalized temperature calculation unit 9 that calculates a temperature obtained by normalizing an instantaneous value of the temperature of the surface of the living body 100 measured by the temperature sensor 4 after the thermal resistance member 5 and the temperature sensor 4 come into contact with the living body 100 by the temperature of the thermal resistance member 5 before the contact and the setting value of the temperature of the surface of the living body 100 after the contact, a temperature wave arrival time derivation unit 10 that derives the temperature wave arrival time t on the basis of the normalized temperature, a proportionality coefficient derivation unit 11 that derives the proportionality coefficient A on the basis of the temperature wave arrival time t, a temperature calculation unit 12 that calculates the core body temperature TCBT (internal temperature) of the living body 100 on the basis of measurement results of the temperature sensors 1 and 2 and the proportionality coefficient A, and a communication unit 13 that transmits a calculation result of the core body temperature TCBT to an external terminal 14.

The temperature estimation apparatus is disposed such that the thermal resistance member 3 comes into contact with the skin of the living body 100. The temperature sensor 1 is provided on the surface of the thermal resistance member 3 on the side of the living body. The temperature sensor 2 is provided on the surface of the thermal resistance member 3 on the side opposite to the surface on the side of the living body to come into contact with air. The thermal resistance member 3 holds the temperature sensor 1 and the temperature sensor 2 and serves as a resistor against heat flowing into the temperature sensor 1.

On the other hand, the temperature sensor 4 is provided on the surface of the thermal resistance member 5 on the side of the living body. The thermal resistance member 5 has thermal characteristics equivalent to those of the thermal resistance member 3. The connection/separation mechanism 6 can bring the thermal resistance member 5 and the temperature sensor 4 into contact with or separate from the living body 100, for example, by moving the thermal resistance member 5 up and down by using the force of a motor.

As the temperature sensors 1, 2 and 4, for example, a known thermistor, a thermopile using a thermocouple, or the like can be used. As the thermal resistance members 3 and 5, resin such as silicone rubber can be used.

FIG. 5 is a flowchart describing operations of the temperature estimation apparatus of the present example. A user of the temperature estimation apparatus brings the thermal resistance member 3 and the living body 100 into contact with each other. It is desirable that the temperature measured by the temperature sensor 1 be substantially equal to the temperature measured by the temperature sensor 2 in the state before the contact with the living body 100. In an initial state where the thermal resistance member 3 and the living body 100 are in contact with each other, the connection/separation mechanism 6 keeps the thermal resistance member 5 and the temperature sensor 4 in a state of being separated from the living body 100.

The temperature sensor 4 measures the temperature $T_{sens\_stb}$ of the thermal resistance member 5 before contact with the living body 100 (step S100 in FIG. 5). Measurement data of the temperature sensor 4 is stored in the storage unit 8.

Next, the control unit 7 controls the connection/separation mechanism 6 to bring the thermal resistance member 5 and the temperature sensor 4 into contact with the living body 100 (step S101 in FIG. 5).

The temperature sensor 4 measures the temperature T of the skin surface of the living body 100 (step S102 in FIG. 5). Measurement data of the temperature sensor 4 is stored in the storage unit 8.

The normalized temperature calculation unit 9 sets an instantaneous value of the temperature T measured by the temperature sensor 4 after contact with the living body 100 as T(z,t), sets a setting value of the temperature T measured by the temperature sensor 4 as $T_{skin\_i}$, and calculates a normalized temperature $(T(z,t)-T_{sens\_stb})/(T_{skin\_i}-T_{sens\_stb})$ on the left side of Equation (4) for each time after the time when the thermal resistance member 5 and the temperature sensor 4 come into contact with the living body 100 (step S103 in FIG. 5).

The temperature wave arrival time derivation unit 10 derives, as the temperature wave arrival time t, a time from a time point at which the thermal resistance member 5 and the temperature sensor 4 come into contact with the living body 100 until the normalized temperature $(T(z,t)-T_{sens\_stb})/(T_{skin\_i}-T_{sens\_stb})$ reaches a predetermined threshold value (step S104 in FIG. 5).

The storage unit 8 stores in advance a calibration table in which the proportionality coefficient A is registered for each square root $\sqrt{t}$ of the temperature wave arrival time t.

The proportionality coefficient derivation unit 11 derives the proportionality coefficient A by acquiring the value of the proportionality coefficient A corresponding to the square root $\sqrt{t}$ of the temperature wave arrival time t derived by the temperature wave arrival time derivation unit 10 from the calibration table in the storage unit 8 (step S105 in FIG. 5).

After deriving the proportionality coefficient A, the control unit 7 controls the connection/separation mechanism 6 to separate the thermal resistance member 5 and the temperature sensor 4 from the living body 100 (step S106 in FIG. 5).

In the present example, an equation for estimating the core body temperature TCBT of the living body 100 is as the following equation.

$$T_{CBT} = T_{skin} + A(T_{skin} - T_{top}) \qquad (10)$$

In order to obtain an experimental value of the proportionality coefficient A plotted in FIG. 3, the temperature wave arrival time t is derived by the procedure of steps S100 to S104 using a pseudo living body sample such as a polymer having a known heat diffusivity in advance as a test subject. After the thermal resistance member 5 and the temperature sensor 4 are separated from the living body 100, the temperature $T_{skin}$ of the surface of the pseudo living body sample is measured by the temperature sensor 1, and the temperature $T_{top}$ at a position away from the pseudo living body sample is measured by the temperature sensor 2. Further, when the internal temperature $T_{CBT}$ of the pseudo living body sample at a site in the surroundings of the thermal resistance member 3 is measured by a heat flux compensating method, for example, it is possible to calculate the proportionality coefficient A from Equation (10). Thus, the relationship between the proportionality coefficient A and the temperature wave arrival time t can be obtained for one pseudo living body sample.

It is possible to produce the calibration table in advance by obtaining such an experimental value of the proportionality coefficient A and the temperature wave arrival time t for multiple pseudo living body samples with different heat diffusivity. Alternatively, a relationship between the proportionality coefficient A and the square root $\sqrt{t}$ of the temperature wave arrival time t may be obtained by numerical calculation.

Next, the temperature sensor 1 measures the temperature $T_{Skin}$ of the skin surface of the living body 100 (step S107 in FIG. 5). The temperature sensor 2 measures the temperature $T_{top}$ at the position away from the living body 100 (step S108 in FIG. 5). The measurement data of the temperature sensors 1 and 2 is stored in the storage unit 8.

The temperature calculation unit 12 calculates the core body temperature $T_{CBT}$ of the living body 100 from Equation (10) on the basis of the temperatures $T_{Skin}$ and $T_{top}$ measured by the temperature sensors 1 and 2 and the proportionality coefficient A derived by the proportionality coefficient derivation unit 11 (step S109 in FIG. 5). Note that calculating $T_{Skin}-T_{top}$ as in Equation (10) corresponds to calculating the heat flux $H_S$ in Equation (1).

The communication unit 13 transmits the calculation result of the temperature calculation unit 12 to the external terminal 14 (step S110 in FIG. 5). The external terminal 14 including a personal computer (PC) or a smartphone displays the value of the core body temperature $T_{CBT}$ received from the temperature estimation apparatus.

The temperature estimation apparatus performs the above processing in steps S101 to S110 at specific time intervals, for example, until a command for ending the measurement is provided from the user (YES in step S111 in FIG. 5).

Figure 6:
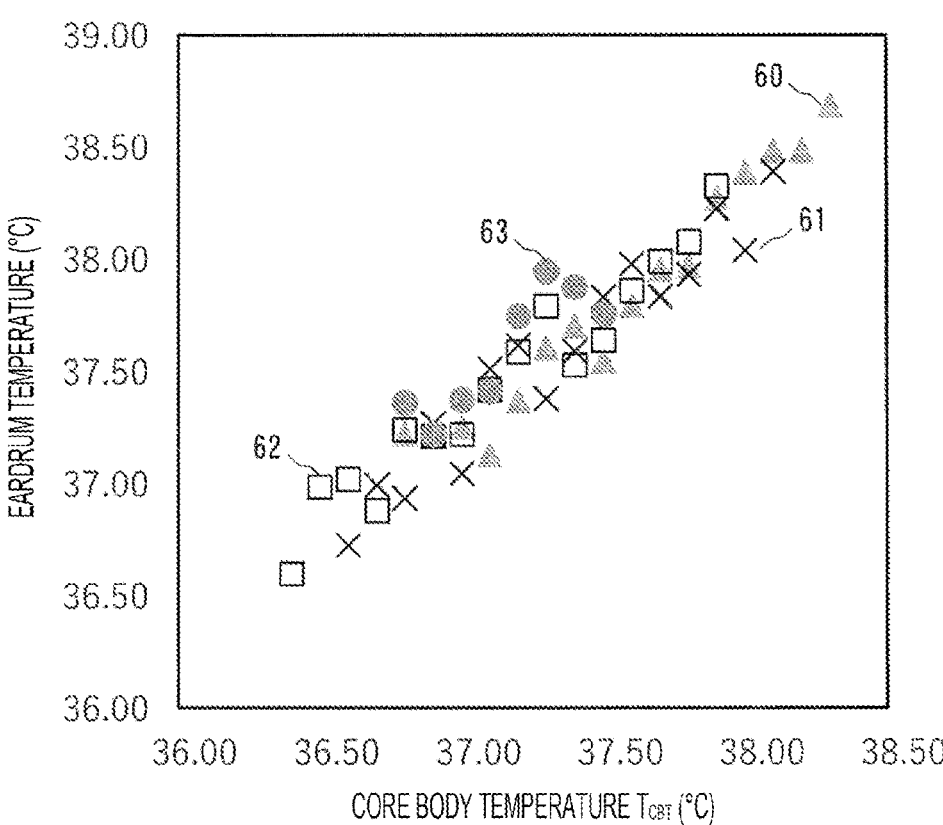
FIG. 6 is a diagram illustrating a core body temperature estimated by the temperature estimation apparatus according to the example of the present invention and an eardrum temperature measured by an eardrum thermometer.

FIG. 6 illustrates the core body temperature $T_{CBT}$ estimated in the present example and the core temperature (eardrum temperature) measured by the eardrum thermometer for comparison. Reference numerals 60, 61, 62, and 63 in FIG. 6 indicate results for different living bodies 100. According to FIG. 6, it can be seen that the estimation result close to the eardrum temperature is obtained by the present example.

Figure 7:
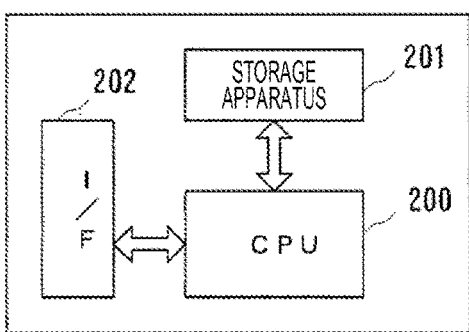
FIG. 7 is a block diagram illustrating a configuration example of a computer that realizes the temperature estimation apparatus according to the example of the present invention.

The control unit 7, the storage unit 8, the normalized temperature calculation unit 9, the temperature wave arrival time derivation unit 10, the proportionality coefficient derivation unit 11, the temperature calculation unit 12, and the communication unit 13 described in the present example can be realized by a computer including a central processing unit (CPU), a storage apparatus, and an interface, and a program that controls these hardware resources. A configuration example of this computer is illustrated in FIG. 7.

The computer includes a CPU 200, a storage apparatus 201, and an interface apparatus (I/F) 202. The I/F 202 is connected to the temperature sensors 1, 2 and 4, the connection/separation mechanism 6, the hardware of the communication unit 13, and the like. In such a computer, the temperature estimation program for realizing the temperature estimation method of the present invention is stored in the storage apparatus 201. The CPU 200 executes the processing described in the present example in accordance with the program stored in the storage apparatus 201.

INDUSTRIAL APPLICABILITY

The present invention can be applied to a technique for estimating an internal temperature of a test subject such as a living body.

REFERENCE SIGNS LIST 1, 2, 4 Temperature sensor
3, 5 Thermal resistance member
6 Connection/separation mechanism
7 Control unit
8 Storage unit
9 Normalized temperature calculation unit
10 Temperature wave arrival time derivation unit
11 Proportionality coefficient derivation unit
12 Temperature calculation unit
13 Communication unit
14 External terminal

The invention claimed is:

1. A temperature estimation method comprising:
a first step of measuring a temperature of a first thermal resistance member by a first temperature sensor before the first thermal resistance member comes into contact with a test subject;
a second step of bringing the first thermal resistance member and the first temperature sensor into contact with the test subject;
a third step of measuring a temperature of a surface of the test subject by the first temperature sensor;
a fourth step of calculating a normalized temperature obtained by normalizing an instantaneous value of the temperature of the surface of the test subject by the temperature of the first thermal resistance member and a setting value of the temperature of the surface of the test subject for each time the first thermal resistance member and the first temperature sensor come into contact with the test subject;
a fifth step of deriving, as a temperature wave arrival time, a time from a time point at which the first thermal resistance member and the first temperature sensor come into contact with the test subject until the normalized temperature reaches a threshold value;
a sixth step of deriving a proportionality coefficient based on the temperature wave arrival time;
a seventh step of separating the first thermal resistance member and the first temperature sensor from the test subject;
an eighth step of measuring a temperature of the surface of the test subject by a second temperature sensor provided on a surface of a second thermal resistance member on a test subject side;
a ninth step of measuring a temperature at a position away from the test subject by a third temperature sensor provided on a surface of the second thermal resistance member on a side opposite to the surface of the second thermal resistance member on the test subject side; and
a tenth step of calculating an internal temperature of the test subject based on measurement results of the eighth and ninth steps and the proportionality coefficient.

2. The temperature estimation method of claim 1, wherein the fourth step includes a step of calculating the normalized temperature by dividing a difference between the instantaneous value of the temperature of the surface of the test subject measured by the first temperature sensor and the temperature of the first thermal resistance member by a difference between the setting value of the temperature of the surface of the test subject measured by the first temperature sensor and the temperature of the first thermal resistance member.

3. The temperature estimation method of claim 1, wherein the sixth step includes a step of deriving the proportionality coefficient by acquiring a value of a stored proportionality coefficient corresponding to the temperature wave arrival time derived in the fifth step from a calibration table stored in advance.

4. A non-transitory computer readable storage medium storing a temperature estimation program that causes a computer to execute the fourth step, the fifth step, the sixth step, and the tenth step of the temperature estimation method of claim 1.

5. A temperature estimation apparatus comprising:
a first thermal resistance member;
a first temperature sensor on a surface of the first thermal resistance member configured to face a test subject;
an actuator configured to bring the first thermal resistance member and the first temperature sensor into contact with the test subject and separate the first thermal resistance member and the first temperature from the test subject;
a normalized temperature calculation circuit configured to calculate, for each time the first thermal resistance member and the first temperature sensor come into contact with the test subject, a normalized temperature by normalizing an instantaneous value of a temperature of a surface of the test subject measured by the first temperature sensor by a temperature of the first thermal resistance member measured by the first temperature sensor before the contact and a setting value of the temperature of the surface of the test subject after the contact;
a temperature wave arrival time derivation circuit configured to derive, as a temperature wave arrival time, a time from a time point at which the first thermal resistance member and the first temperature sensor come into contact with the test subject until the normalized temperature reaches a threshold value;
a proportionality coefficient derivation circuit configured to derive a proportionality coefficient based on the temperature wave arrival time;
a second thermal resistance member configured to contact the test subject;
a second temperature sensor on a surface of the second thermal resistance member on a test subject side and configured to measure the temperature of the surface of the test subject;
a third temperature sensor on a surface of the second thermal resistance member on a side opposite to the surface on the test subject side of the second thermal resistance member and configured to measure a temperature at a position away from the test subject; and
a temperature calculation circuit configured to calculate an internal temperature of the test subject based on the measurement results of the second and third temperature sensors after the first thermal resistance member and the first temperature sensor are separated from the test subject and the proportionality coefficient.

6. The temperature estimation apparatus of claim 5, wherein the normalized temperature calculation circuit is configured to calculate the normalized temperature by dividing a difference between the instantaneous value of the temperature of the surface of the test subject measured by the first temperature sensor and the temperature of the first thermal resistance member by a difference between the setting value of the temperature of the surface of the test subject measured by the first temperature sensor and the temperature of the first thermal resistance member.

7. The temperature estimation apparatus of claim 5, further comprising:

a storage device configured to store in advance a calibration table in which the proportionality coefficient corresponding to the temperature wave arrival time is registered for each temperature wave arrival time, wherein the proportionality coefficient derivation circuit is configured to derive the proportionality coefficient by acquiring a value of the proportionality coefficient corresponding to the temperature wave arrival time derived by the temperature wave arrival time derivation circuit from the calibration table.

8. A temperature estimation method comprising:

bringing a first thermal resistance member into contact with a test subject;

measuring a first temperature of a surface of the test subject;

calculating a temperature normalized by an instantaneous value of the first temperature of the surface of the test subject and a temperature of the first thermal resistance member and a setting value of the temperature of the surface of the test subject;

deriving, as a temperature wave arrival time, a time from a time point at which the first thermal resistance member comes into contact with the test subject until the normalized temperature reaches a threshold value;

deriving a proportionality coefficient based on the temperature wave arrival time;

separating the first thermal resistance member from the test subject;

measuring a second temperature of the surface of the test subject;

measuring a third temperature of a surface of a second thermal resistance member on a side opposite to a surface of the second thermal resistance member on a test subject side; and calculating an internal temperature of the test subject based on the second temperature, the third temperature, and the proportionality coefficient.

9. The temperature estimation method of claim 8, wherein calculating the temperature normalized is performed each time the first thermal resistance member comes into contact with the test subject.

10. The temperature estimation method of claim 8, wherein calculating the first temperature normalized includes dividing a difference between the instantaneous value of the temperature of the surface of the test subject and the temperature of the first thermal resistance member by a difference between the setting value of the temperature of the surface of the test and the temperature of the first thermal resistance member.

11. The temperature estimation method of claim 8, wherein deriving the proportionality coefficient includes deriving the proportionality coefficient by acquiring a value of a stored proportionality coefficient corresponding to the temperature wave arrival time.

12. The temperature estimation method of claim 3, wherein the proportionality coefficient corresponding to the temperature wave arrival time is registered as the stored proportionality coefficient for each temperature wave arrival time in the calibration table.

13. The temperature estimation method of claim 11, wherein the proportionality coefficient corresponding to the temperature wave arrival time is registered as the stored proportionality coefficient in a calibration table stored in advance.

* * * * *